US008755499B2

United States Patent
Kung et al.

(10) Patent No.: US 8,755,499 B2
(45) Date of Patent: *Jun. 17, 2014

(54) METHODS, COMPUTER PROGRAM PRODUCTS, AND SYSTEMS FOR MANAGING VOICE OVER INTERNET PROTOCOL (VOIP) NETWORK ELEMENTS

(75) Inventors: Yu-Lein Kung, Holmdel, NJ (US); Jeffrey Stein, Cliffwood, NJ (US)

(73) Assignee: AT&T Intellectual Propert I, L.P., Atlanta, GA (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/596,378

(22) Filed: Aug. 28, 2012

(65) Prior Publication Data

US 2012/0328083 A1    Dec. 27, 2012

Related U.S. Application Data

(63) Continuation of application No. 12/277,449, filed on Nov. 25, 2008, now Pat. No. 8,270,579.

(51) Int. Cl.
*H04M 15/00* (2006.01)
*H04M 1/24* (2006.01)

(52) U.S. Cl.
USPC ............... 379/112.06; 379/14.01; 379/133

(58) Field of Classification Search
USPC ............ 379/9.03, 9.04, 14.01, 112.06, 126, 379/133, 139; 370/352
See application file for complete search history.

(56) References Cited

U.S. PATENT DOCUMENTS

| 6,411,681 | B1 | 6/2002 | Nolting et al. |
| 6,891,938 | B1 | 5/2005 | Scott et al. |
| 7,245,609 | B2 | 7/2007 | D'Eletto |
| 7,773,727 | B1 | 8/2010 | Eslambolchi et al. |
| 8,270,579 | B2 * | 9/2012 | Kung et al. .............. 379/112.06 |
| 2009/0122969 | A1 | 5/2009 | Dowens et al. |
| 2009/0304165 | A1 | 12/2009 | Chung et al. |

\* cited by examiner

*Primary Examiner* — Quoc D Tran
(74) *Attorney, Agent, or Firm* — Cantor Colburn LLP

(57) ABSTRACT

Methods, computer program products, and systems for managing VoIP network elements are provided. Methods include receiving call details records (CDRs) from a plurality of network elements. The received CDRs including disconnect cause codes and telephone call correlation identifiers. The received CDRs are correlated to telephone calls based on the telephone call correlation identifiers. Two CDR records are associated with the same telephone call when their telephone call correlation identifiers are the same. A master correlated CDR is created for each telephone call. The creating includes assigning a correlated disconnect cause code and classifying the telephone call. The assigning and classifying are responsive to the received CDRs associated with the telephone call. The master correlated CDR includes the correlated disconnect cause code and the telephone call classification. A threshold crossing alert (TCA) is generated in response to a threshold for the correlated disconnect cause code being reached.

18 Claims, 4 Drawing Sheets though VoIP technology has been in the market for several years, its service assurance for performance, reliability, and maintenance automation is relatively new in the network management arena. VoIP billing records, referred to as call detail records (CDRs), from multiple network equipment vendors are used separately to monitor and proactively respond to network or service impacting events. Without a common correlation identifier for CDRs among all VoIP network elements, it is difficult to produce an accurate end-to-end view of a telephone call. Network managers are forced to use inexact methods to correlate events, such as relating in-going and out-going Internet Protocol (IP) addresses. These inexact methods can lead to inaccurate call statistics for the entire VoIP network and for each service supported in the VoIP network. In addition, the performance alerts generated from each type of network element may not reflect the actual trouble area.

METHODS, COMPUTER PROGRAM PRODUCTS, AND SYSTEMS FOR MANAGING VOICE OVER INTERNET PROTOCOL (VOIP) NETWORK ELEMENTS

CROSS-REFERENCE TO RELATED APPLICATIONS

This application is a continuation of U.S. patent application Ser. No. 12/277,449 filed Nov. 25, 2008, the contents of which are incorporated by reference herein in their entirety.

BACKGROUND

Exemplary embodiments relate generally to managing network elements, and more particularly to managing voice over Internet protocol (VoIP) network elements.

Although VoIP technology has been in the market for several years, its service assurance for performance, reliability, and maintenance automation is relatively new in the network management arena. VoIP billing records, referred to as call detail records (CDRs), from multiple network equipment vendors are used separately to monitor and proactively respond to network or service impacting events. Without a common correlation identifier for CDRs among all VoIP network elements, it is difficult to produce an accurate end-to-end view of a telephone call. Network managers are forced to use inexact methods to correlate events, such as relating in-going and out-going Internet Protocol (IP) addresses. These inexact methods can lead to inaccurate call statistics for the entire VoIP network and for each service supported in the VoIP network. In addition, the performance alerts generated from each type of network element may not reflect the actual trouble area.

BRIEF SUMMARY

Exemplary embodiments include a method for managing VoIP network elements. The method includes receiving call details records (CDRs) from a plurality of network elements. The received CDRs include disconnect cause codes and telephone call correlation identifiers. The received CDRs are correlated to telephone calls based on the telephone call correlation identifiers. Two CDR records are associated with the same telephone call when their telephone call correlation identifiers are the same. A master correlated CDR is created for each telephone call. The creating includes assigning a correlated disconnect cause code and classifying the telephone call. The assigning and classifying are responsive to the received CDRs associated with the telephone call. The master correlated CDR includes the correlated disconnect cause code and the telephone call classification. A threshold crossing alert (TCA) is generated in response to a threshold for the correlated disconnect cause code being reached.

Additional exemplary embodiments include a system for managing VoIP network elements. The system includes a CDR collector machine receiving CDRs from a plurality of network elements. The received CDRs include disconnect cause codes and telephone call correlation identifiers. The system also includes a master correlated CDR machine that correlates the received CDRs to telephone calls based on the telephone call correlation identifiers. Two CDR records are associated with the same telephone call when their telephone call correlation identifiers are the same. The master correlated CDR machine also creates a master correlated CDR for each telephone call. The creating includes assigning a correlated disconnect cause code and classifying the telephone call. The assigning and classifying are responsive to the received CDRs associated with the telephone call. The master correlated CDR includes the correlated disconnect cause code and the telephone call classification. The system also includes an alert processing machine generating a TCA in response to a threshold for the correlated disconnect cause code being reached.

Further exemplary embodiments include a computer program product, tangibly embodied on a computer readable medium, for managing VoIP network elements. The computer program product has instructions for causing a computer to execute a method, which includes receiving call details records (CDRs) from a plurality of network elements. The received CDRs include disconnect cause codes and telephone call correlation identifiers. The received CDRs are correlated to telephone calls based on the telephone call correlation identifiers. Two CDR records are associated with the same telephone call when their telephone call correlation identifiers are the same. A master correlated CDR is created for each telephone call. The creating including assigning a correlated disconnect cause code and classifying the telephone call. The assigning and classifying are responsive to the received CDRs associated with the telephone call. The master correlated CDR includes the correlated disconnect cause code and the telephone call classification. A threshold crossing alert (TCA) is generated in response to a threshold for the correlated disconnect cause code being reached.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGs..

The detailed description explains the exemplary embodiments, together with advantages and features, by way of example with reference to the drawings.

DETAILED DESCRIPTION OF EXEMPLARY EMBODIMENTS

Exemplary embodiments provide, as part of voice over Internet protocol (VoIP) network maintenance automation, an accurate end-to-end view of a telephone call as it travels through the network. This end-to-end view of the telephone call is created by utilizing a common telephone call correlation identifier (ID) for call detail records (CDRs) among all VoIP network elements utilized by the telephone call. The common telephone call correlation ID is utilized to generate a master correlated CDR that reflects the CDRs generated by the network elements utilized by the telephone call. In exemplary embodiments, the common telephone call correlation ID is also utilized to provide an end-to-end view of threshold crossing alerts, and to generate call statistics and reports.

Figure 1:
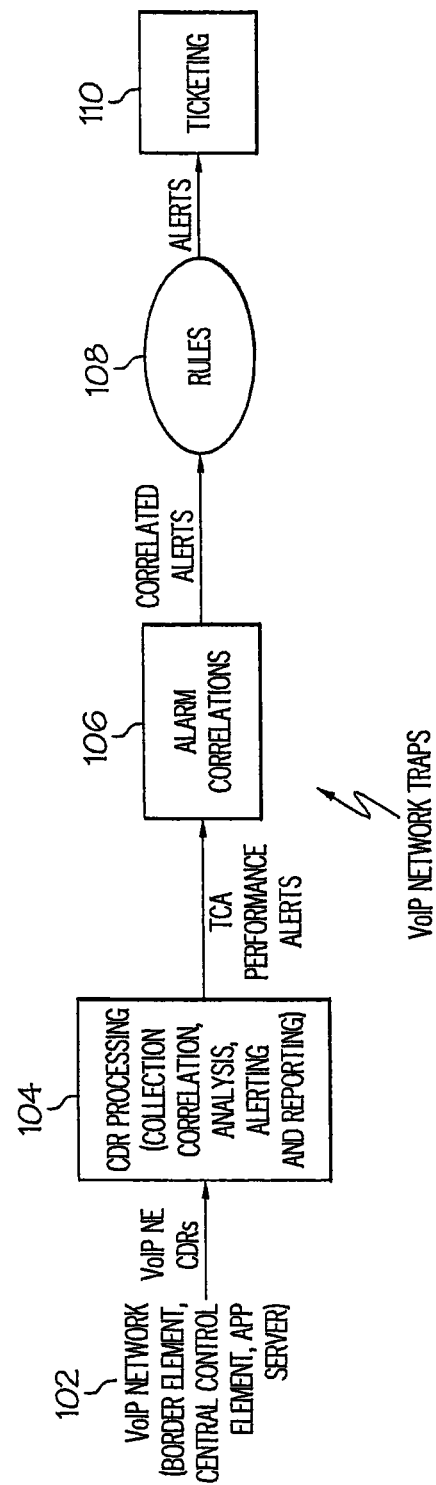
FIG. 1 illustrates a high level view of a process for managing VoIP network elements that may be implemented by exemplary embodiments.

FIG. 1 illustrates a high level view of a process for managing VoIP network elements that may be implemented by exemplary embodiments. VoIP CDRs are generated by network elements (e.g., border elements, central control elements, and application servers) in a VoIP network 102. A CDR provides detailed information about telephone calls that originate from, terminate at, or pass through each network element in the VoIP. In exemplary embodiments, the CDRs include information that may be utilized for billing such as, but not limited to: arrival time at network element, exit time from network element, record type, disconnect cause code, and telephone call correlation ID. The CDRs are received at a CDR processing module/system 104 to perform CDR collection, correlation, analysis, alerting and reporting.

The CDR processing module/system 104 generates threshold crossing alerts (TCAs) (also referred to herein as TCA performance alerts) when specified thresholds are exceeded. TCA performance alerts may be generated for network conditions such as blockage, cutoff, busy, packet loss, particular disconnect cause codes, data not ready, and ring no answer. In exemplary embodiments, the TCA performance alerts are fed into an alarm correlations module/system 106 along with VoIP network traps (also referred to herein as native traps) from the network elements. The alarm correlations module/system 106 correlates the network element native traps and the TCA performance alerts and generates correlated alerts that are fed into a rules module/system 108. The rules module/system 108 includes additional rules for further alarm reduction. The rules module/system 108 generates alerts that are fed into a ticketing module/system 110 for generating service tickets that in exemplary embodiments are sent to a work center for evaluation and/or trouble-shooting.

Figure 2:
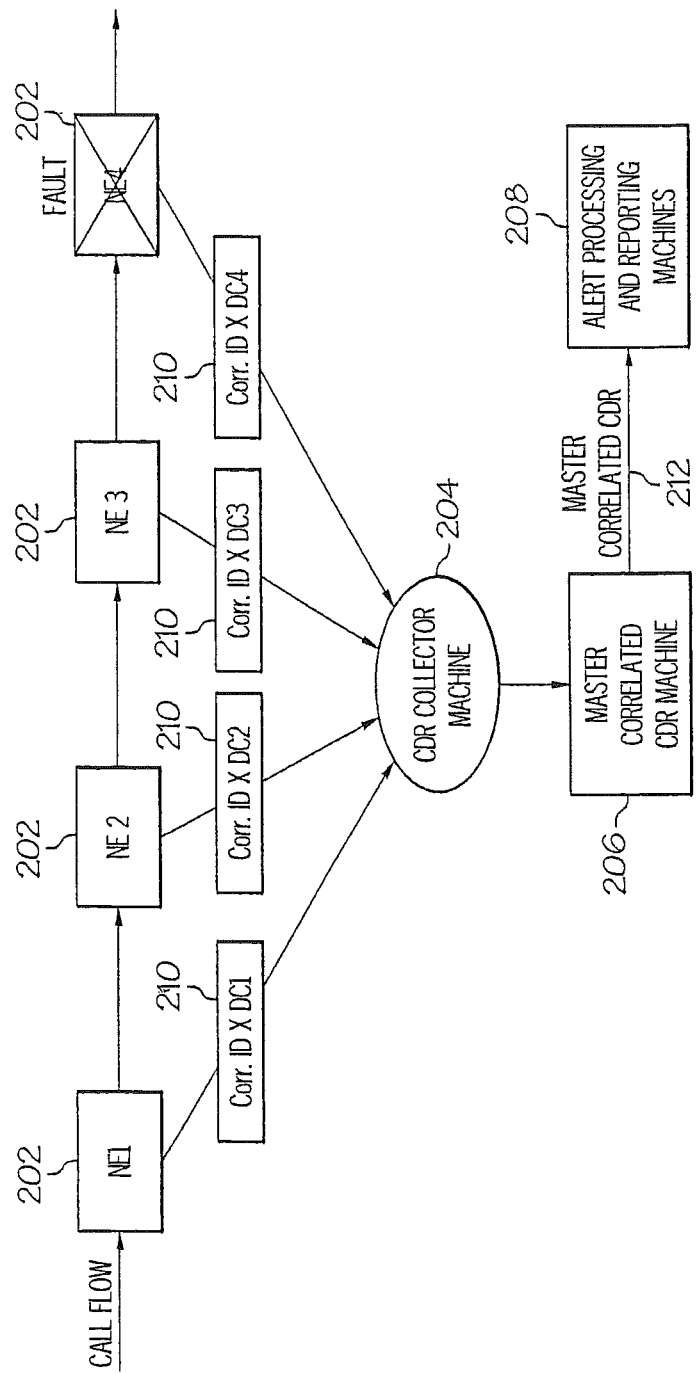
FIG. 2 illustrates a block diagram of a system that may be implemented by exemplary embodiments to manage VoIP network elements.

FIG. 2 illustrates a block diagram of a system that may be implemented by exemplary embodiments to manage VoIP network elements. The system includes several network elements 202, each generating a CDR 210 having data that includes a telephone call correlation ID (labeled "Corr. ID X") and a disconnect cause code (labeled "DC#"). In the system depicted in FIG. 2, a fault occurs at the network element 202 labeled "NE4." In the exemplary embodiment depicted in FIG. 2, the correlation IDs are the same for all of the CDRs 210 because they all are associated with the same telephone call in the VoIP network. In exemplary embodiments, the disconnect cause codes differ depending on the type of network element, the network element vendor, and the stage of progress of the call. Disconnect cause codes may include, but are not limited to: blockage, cutoff, busy, packet loss, particular disconnect cause codes, data not ready, and ring no answer As depicted in FIG. 2, the CDRs 210 are collected by a CDR collector machine 204. As used herein, the term "machine" refers to computer software and/or hardware elements. The CDR collector machine 204 sends the CDRs 210 to a master correlated CDR machine 206. The master correlated CDR machine 206 creates master correlated CDRs 212 for each telephone call and transmits them to alert processing and reporting machines 208. In exemplary embodiments, the master correlated CDRs 212 include a correlated disconnect cause code and a telephone call classification. Additional data may also be provided in the master correlated CDR 212 such as telephone call start and stop time, record type, call direction and network element node name list. In exemplary embodiments, the CDR collector machine 204, the master correlated CDR machine 206, and the alert processing and reporting machines 208 make up the CDR processing module/system 104 depicted in FIG. 1.

In exemplary embodiments, the alert processing and reporting machines 208 generate reports based on the master correlated CDRs 212. Exemplary embodiments generate master correlated CDR detail reports autonomously to alleviate human intervention. In addition, exemplary embodiments include allowing a report requestor (e.g., a user) to query and view the master correlated CDR data. In further exemplary embodiments, the report requestor may filter, sort, perform trend analysis, transfer, and/or electronically mail the reports.

In exemplary embodiments, the master correlated CDRs 212 are stored for a configurable time period to avoid the necessity of storing individual network element CDRs 210.

In exemplary embodiments, the alert processing and reporting machines 208 perform master correlated CDR analysis and overall call statistics generation based on the master correlated CDRs 212. Derived overall telephone call statistics may be generated based on: per call classification, per call direction (e.g., from PSTN to VoIP, from VoIP to VoIP), per call service (e.g, business VoIP), total call attempts, and other criteria. In addition, other overall statistics such as average holding time per call direction and per service may be derived. Statistics derived from the individual network element CDRs 210 and the master correlated CDRs 212 may be stored for a configurable period of time.

Figure 3:
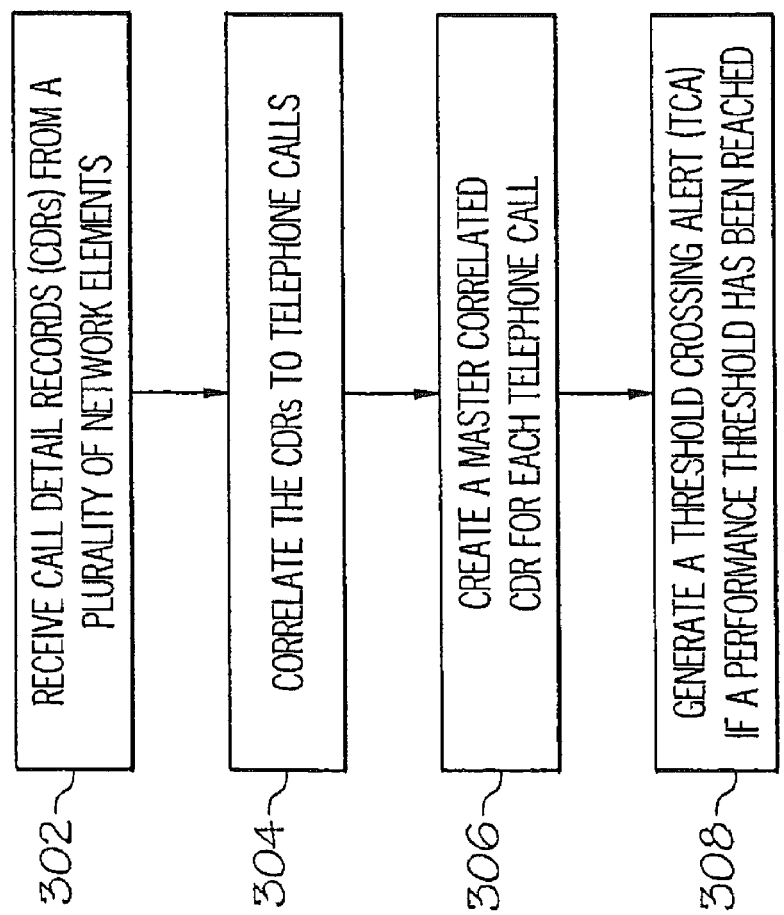
FIG. 3 illustrates a process flow for managing VoIP network elements that may be implemented by exemplary embodiments.

FIG. 3 illustrates a process flow for managing VoIP network elements that may be implemented by exemplary embodiments. At block 302, CDRs, such as the CDRs 210 from a plurality of network elements 202 are received at the CDR collector machine 204. The CDRs 210 are associated with one or more telephone calls via the common telephone call correlation ID that is assigned by the network elements 202 when CDRs, such as the CDRs 210 are created. At block 304, the received CDRs 210 are correlated to the telephone calls by the master correlated CDR machine 206. The CDRs 210 that have the same telephone call correlation ID are associated with the same telephone call. At block 306, a master correlated CDR 212, such as the master correlated CDR 212, is created for each telephone call by the master correlated CDR machine 206. In exemplary embodiments, the master correlated CDRs 212 include a correlated disconnect cause code and a telephone call classification.

At block 308 in FIG. 3, a TCA is generated if a performance threshold has been reached. As described previously, TCA performance alerts may be generated for network conditions such as, but not limited to, blockage, cutoff, busy, packet loss, particular disconnect cause codes, data not ready, and ring no answer. The TCA is forwarded to the alarms correlations module/system 106 and rules system 108 for trouble ticket generation. In exemplary embodiment, thresholds on call failure data are set based on expert judgment on the likelihood of events of this type occurring. In other exemplary embodiments a feed of master correlated CDRs 212 is sent to a test system that has a set of trial thresholds implemented. Different network scenarios can then be implemented and sensitivity to the problem adjusted. In addition, a duplicate CDR feed of master correlated CDRs 212 from the live network can be sent to a test system to "soak test" a proposed set of thresholds. It can be appreciated that there is a fine line that needs to be tread between being sensitive to real network problems and generating a lot of false positives which flood network managers with a lot of alerts, which they eventually may become de-sensitized to.

In exemplary embodiments, thresholds are set in order to balance detection of real and persistent problems with generating so many alerts that network managers disregard them. Exemplary systems have the ability to perform persistence and aging processing with alerts being processed at regular specified intervals (e.g. five minutes). In exemplary embodiments, the first time a threshold is crossed in the specified interval, a decision to take no action may be made unless the same problem occurs in the next specified interval. In exemplary embodiments, the threshold for any problems with calls associated with "911" service are set to the lowest possible value in order to trigger an immediate alert. The number of specified intervals can be provisioned to wait after a threshold is crossed before triggering an alert. TCA alerts and corresponding clears are used to indicate that a problem no longer exists. The number of specified intervals can be configured to wait when the threshold for a particular alert is no longer crossed. Clears indicate to network managers that a problem is no longer impacting the network but that they still may need to take some action to see if it may recur. Clear can be set up to automatically close trouble tickets or to remove alerts visually displayed on wall boards used by the network managers to monitor network health.

Master correlated CDRs 212 that indicate defects in associated entities can be aggregated. This includes such targets for aggregation as numbering plan area (area code), network element (e.g., switch), service (e.g., 911 calls, various business offerings), and disconnect code (e.g., timer expiration). Separate thresholds can be set for the number of defect calls aggregated against a node in a specified time period, an area code in a specified time period, and so forth. For example, it may be decided that, if there are one hundred telephone calls with the defect of blocked for a network element 202 within a specified time period, then a network element block alert will be generated if a specified number of additional telephone calls with a defective block are received. If after waiting a further specified time interval, the number of defects has stayed below the threshold of one hundred, then a clear is issued for the event.

Figure 4:
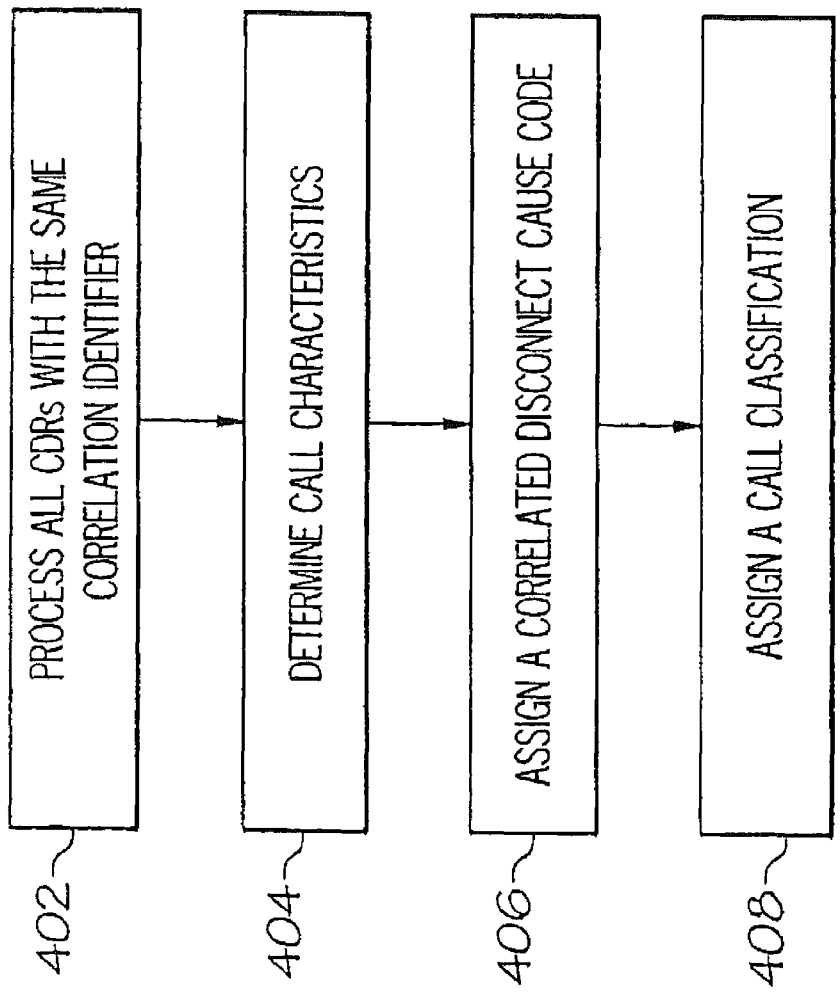
FIG. 4 illustrates a process flow for creating correlated CDRs that may be implemented by exemplary embodiments.

FIG. 4 illustrates a process flow for creating master correlated CDRs 212 that may be implemented by exemplary embodiments. In exemplary embodiments, the process depicted in FIG. 4 is implemented by the master correlated CDR machine 206 depicted in FIG. 2. At block 402, all CDRs 210 received from network elements 202 with the same telephone call correlation ID are processed. In exemplary embodiments, the system may need to delay a time interval until all of the CDRs 210 for a telephone call are received. At block 404, telephone call characteristics are determined based on contents of the CDRs 210 associated with the telephone call. In exemplary embodiments this includes characteristics such as earliest start time, latest stop time, record type (attempt or stop), call direction, network element node name list, disconnect cause code list, and other unique and common CDR fields of interest (e.g., to a particular vendor or network element). In exemplary embodiments, a record type of attempt means that the call failed and the disconnect cause code should be taken into account, and a record type of stop means that the call was successful.

In exemplary embodiments, an "n-field rule" that uses the values of a subset of "n" fields in the master correlated CDR 212 is utilized to assign the correlated disconnect cause code and to classify the telephone call. At block 406, a correlated disconnect cause code is assigned to the master correlated CDR 212. In exemplary embodiments, the correlated disconnect codes include, but are not limited to: blockage, cutoff, busy, packet loss, particular disconnect cause codes, data not ready, and ring no answer. The individual disconnect codes in the CDRs 210 are examined and a set of rules is implemented. Typically, when something goes wrong in a chain of network elements handling a call, the disconnect code for the failed network element 202 is the most informative. Disconnect codes from network elements 202 previous to it may indicate a success or failure; and network elements 202 after the failed network element 202 will either echo the failed network element's disconnect code or pass along their particular version of it. The chain of disconnect codes on the CDRs 210 are examined to find the first failure. The correlated disconnect code typically reflects the disconnect code of the first failed network element 202 in the chain of network elements handling the telephone call.

An example of a call characteristic is duration time; if all of the calls are suddenly staying up for only a short period of time there may be a problem. Another example call characteristic is packet loss; it may indicate that the call stayed up, but that the audio quality was poor. Often, CDRs 210 contain embedded billing information that relate the call to a particular network provider offering and this can be utilized to indicate that a particular network provider service is having a problem.

At block 408, a call classification is assigned to the master correlated CDR 212. Call classifications include, but are not limited to: ring no answer, busy, successful, blocked, and cutoff. In exemplary embodiments, the CDR n-field rules described previously are utilized to classify the calls. For example, one of the "n-fields" indicates whether the call was successful or that it had failed. If the call failed, then another field of the "n-fields" indicates what the problem is related to. It could indicate that the call is related to a block (i.e., the call never even gets set up to the point where user communication takes place), or that the call was "cut-off" (the call got set up okay, but it was terminated due to something other than satisfied users hanging up the phone). Various disconnect codes (more of the n-fields) indicate if the call was a ring no answer, busy, or successful. Other parameters, such as call direction (e.g., VoIP-to-PSTN, PSTN-to-VoIP, VoIP-to-VoIP) help isolate the problem to the VoIP network platform, or the public switched telephone network (PSTN). In exemplary embodiments, a disconnect initiator indicates if the calling party, the called party, or the switch hung up the call. If the call direction is PSTN-to-VoIP and the call terminator is always the called party, and this seems to be happening in excess, then there may be a problem with the VoIP network.

Technical effects and benefits of exemplary embodiments include the ability to utilize a common correlation ID for the CDR 210 from different network elements 202 and different network element vendors. Thus, a master correlated CDR, such as the master correlated CDR 212, may be generated based on information from the CDR 210 from multiple network elements 202 utilized by a telephone call. This allows for an accurate end-to-end view of call statistics and reporting. In addition, this may lead to a reduction in the amount of time required to analyze performance alerts.

As described above, exemplary embodiments can be in the form of computer-implemented processes and apparatuses for practicing those processes. Exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the present disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings of the present disclosure without departing from the essential scope thereof. Therefore, it is intended that the present disclosure not be limited to the particular exemplary embodiments disclosed for carrying out this invention, but that the present disclosure will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for managing a network, the method comprising:
   receiving call details records from a plurality of network elements, the call details records including disconnect cause codes and telephone call correlation identifiers;
   correlating the call details records to telephone calls based on the telephone call correlation identifiers, wherein two received call details records are associated with the same telephone call when the two received call details records have the same telephone call correlation identifiers;
   creating a master correlated call details record for a telephone call, the creating including assigning a correlated disconnect cause code, the assigning responsive to the call details records associated with the telephone call, and the master correlated call details record including the correlated disconnect cause code; and
   generating a threshold crossing alert in response to a threshold for the correlated disconnect cause code being reached.

2. The method of claim 1 wherein the assigning the correlated disconnect cause code includes determining call characteristics for the telephone call based on the call details records associated with the telephone call, and assigning the correlated disconnect cause code based on the call characteristics.

3. The method of claim 2 wherein the call characteristics include earliest start time, latest stop time, record type, call direction, network element node name list, and disconnect cause list.

4. The method of claim 1 wherein generating the threshold crossing alert includes forwarding the threshold crossing alert to an alert processing module for trouble ticket generation.

5. The method of claim 1 further comprising generating overall telephone call statistics for the telephone calls in response to the master correlated call details record.

6. The method of claim 1 further comprising generating a report in response to input from a report requestor and to the master correlated call details records, the generating the report including forwarding the report to the report requestor.

7. A system for managing a network, the system comprising:
   a call details record collector machine receiving call details records from a plurality of network elements, the call details records including disconnect cause codes and telephone call correlation identifiers;
   a master correlated call details record machine:
   correlating received call details records to telephone calls based on the telephone call correlation identifiers, wherein two received call details records are associated with the same telephone call when the two received call details records have the same telephone call correlation identifiers; and
   creating a master correlated call details record for a telephone call, the creating including assigning a correlated disconnect cause code, the assigning responsive to the received call details records associated with the telephone call, and the master correlated call details record including the correlated disconnect cause code; and
   an alert processing machine generating a threshold crossing alert in response to a threshold for the correlated disconnect cause code being reached.

8. The system of claim 7 wherein the assigning the correlated disconnect cause code includes determining call characteristics for the telephone call based on the received call details records associated with the telephone call and assigning the correlated disconnect cause code based on the call characteristics.

9. The system of claim 8 wherein the call characteristics include earliest start time and latest stop time, record type, call direction, network element node name list, and disconnect cause list.

10. The system of claim 7 wherein the generating the threshold crossing alert includes forwarding the threshold crossing alert to an alert processing machine for trouble ticket generation.

11. The system of claim 7 wherein the master correlated call details record machine further generates overall telephone call statistics for the telephone calls in response to the master correlated call details record.

12. The system of claim 7 further comprising a reporting machine generating a report in response to input from a report requestor and to the master correlated call details records, the generating the report including forwarding the report to the report requestor.

13. A computer program product, tangibly embodied on a computer readable medium, for managing a network, the computer program product including instructions for causing a computer to execute a method, comprising:
   receiving call details records from a plurality of network elements, the call details records including disconnect cause codes and telephone call correlation identifiers;
   correlating received call details records to telephone calls based on the telephone call correlation identifiers, wherein two received call details records are associated with the same telephone call when the two received call details records have the same telephone call correlation identifiers;
   creating a master correlated call details record for a telephone call, the creating including assigning a correlated disconnect cause code, the assigning responsive to the received call details records associated with the telephone call, and the master correlated call details record including the correlated disconnect cause code; and
   generating a threshold crossing alert in response to a threshold for a correlated disconnect cause code being reached.

14. The computer program product of claim 13 wherein the assigning the correlated disconnect cause code includes determining call characteristics for the telephone call based on the received call details records associated with the telephone call, and assigning the correlated disconnect cause code based on the call characteristics.

15. The computer program product of claim 14 wherein the call characteristics include earliest start time, latest stop time, record type, call direction, network element node name list, and disconnect cause list.

16. The computer program product of claim 13 wherein the generating the threshold crossing alert includes forwarding the threshold crossing alert to an alert processing module for trouble ticket generation.

17. The computer program product of claim 13 wherein the method further comprises generating overall telephone call statistics for the telephone calls in response to the master correlated call details record.

18. The computer program product of claim 13 wherein the method further comprises generating a report in response to input from a report requestor and to the master correlated call details records, the generating the report including forwarding the report to the report requestor.

* * * * *